May 26, 1925.   1,539,600
A. A. RENTFROW ET AL
TIRE PROTECTOR
Filed Aug. 22, 1922
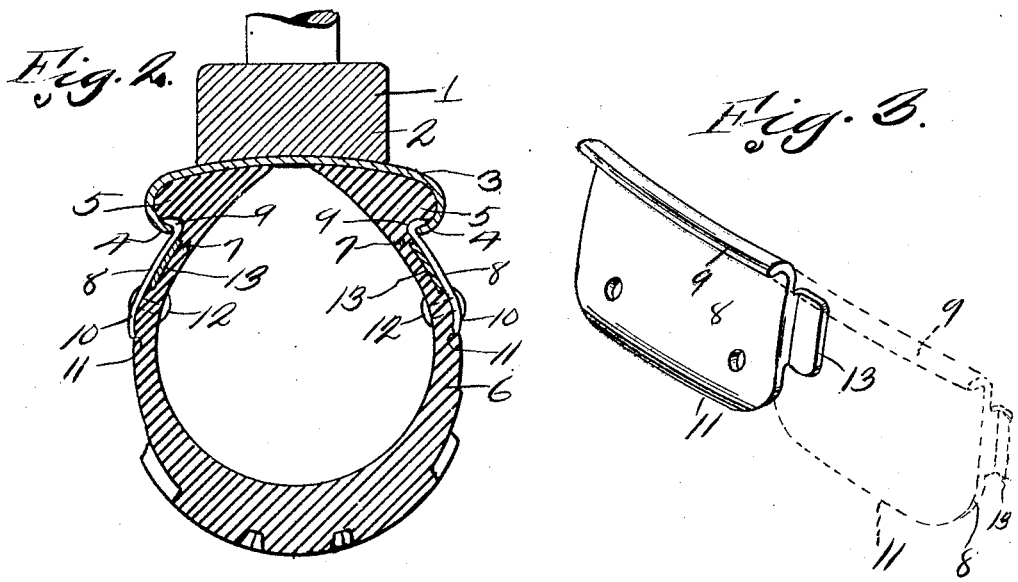
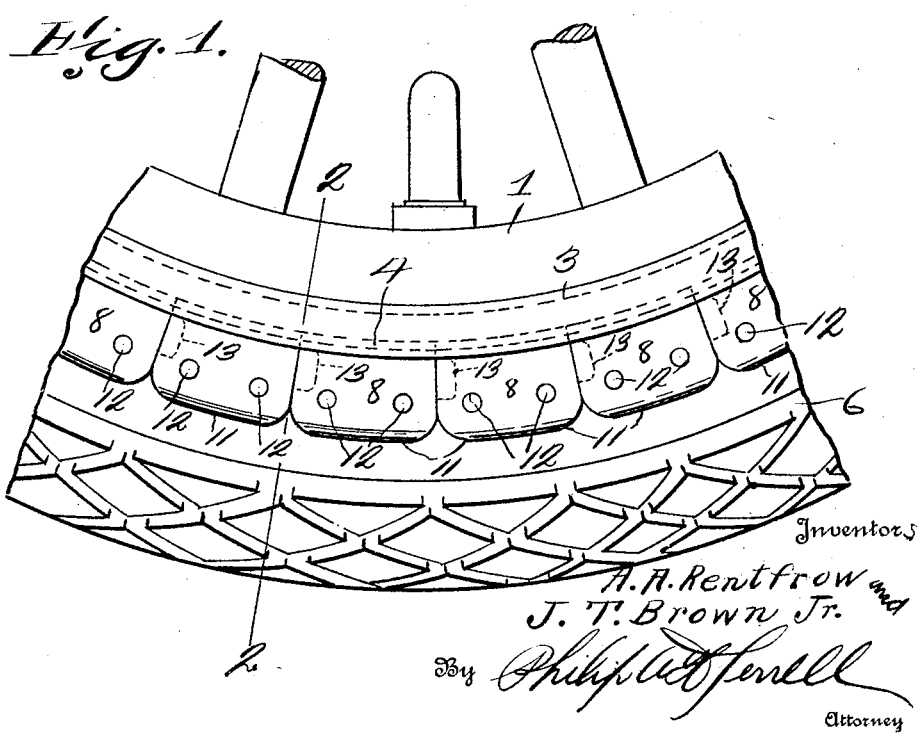
Inventors
A. A. Rentfrow and
J. T. Brown Jr.
By Philip A. Ferrell
Attorney Patented May 26, 1925.

1,539,600

UNITED STATES PATENT OFFICE.

ALONZO A. RENTFROW AND JAMES T. BROWN, JR., OF OMAHA, NEBRASKA; SAID RENTFROW ASSIGNOR TO SAID BROWN.

TIRE PROTECTOR.

Application filed August 22, 1922. Serial No. 583,531.

*To all whom it may concern:*

Be it known that ALONZO A. RENTFROW and JAMES T. BROWN, Jr., citizens of the United States, residing at Omaha, in the county of Douglas and State of Nebraska, have invented certain new and useful Improvements in Tire Protectors, of which the following is a specification, reference being had therein to the accompanying drawings.

The invention relates to tire protectors and has for its object to provide plates adapted to engage the sides of the casing of a pneumatic tire, and engage the rim flanges of the wheel, and protect the tire from rim cuts, which rim cuts considerably reduce the life of the tire casing.

A further object is to provide the plates with inwardly offset flanges adapted to underlie adjacent plates. Also to secure the plates to the sides of the tire casing.

A further object is to provide the outer ends of the plates with concaved portions extending longitudinally and forming means whereby the outer edges of the plates will bite into the outer wall of the casing, thereby preventing foreign matter from collecting beneath the plates.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of a portion of a conventional form of automobile wheel and tire showing a plurality of plates applied thereto.

Figure 2 is a transverse sectional view taken on line 2—2 of Figure 1.

Figure 3 is a perspective view of one of the protecting plates.

Referring to the drawing, the numeral 1 designates a portion of a conventional form of automobile wheel, 2 the felly thereof, and 3 the rim, which is provided with inwardly extending flanges 4. The flanges 4 extend over conventional clincher flanges 5 of the tire casing 6 and hold said casing on the rim 3. It has been found that tire casings 6 become what is known as rim cut at 7 from various causes, such for instance as under-inflation or operating the automobile when the tire is not inflated. To obviate this difficulty, or to protect the tire after the same has become rim cut, plates 8 are provided. Plates 8 conform substantially to the contour of the outer wall of the tire casing 6 adjacent the flanges 4, and are provided with outwardly extending flanges 9, which hook under the flanges 4 of the rim. The plates 8 adjacent their outer ends have their inner sides concaved as at 10 at a smaller radius than the radius of the outer face of the tire, thereby forming inwardly extending ends 11, which bite into the outer wall of the tire casing and prevent foreign matter from collecting beneath the plates 8, after said plates have been secured in place by means of the rivets 12. One end of each of the plates 8 is provided with an inwardly offset flange 13, which flange engages under the adjacent end of the adjacent plate and prevents outward movement of the plates in relation to each other, thereby maintaining the plates in abutting engagement.

It will be seen that as the tire spreads transversely incident to the weight of the automobile, or incident to the inflation of the tire, the plates 8 will move outwardly and upwardly, however their flanges 9 will remain in engagement with the flanges 4 of the rim 3, the plates preventing the flanges 4 from engaging the outer wall of the casing 6 and rim cutting the casing.

From the above it will be seen that a tire casing protecting plate is provided, which plate may be easily and quickly applied to a tire casing, any number of plates used and the plates constructed in such a manner that they may be easily and quickly applied to the tire casing. It will also be seen that the plates will not interfere with the removal of the tire casing, and the plates are stamped from a single sheet of metal thereby reducing the cost of production to a minimum.

The invention having been set forth what is claimed as new and useful is:—

The combination with a tire casing, said tire casing being disposed on a rim, inwardly extending flanges carried by said rim, said flanges engaging over clincher flanges carried by the tire casing, of means for preventing the rim flanges from cutting the tire casing, said means comprising plates in abutting registering end engagement with each other and engaging the sides of the casing and secured thereto, outwardly extending flanges carried by the plates and underlying the rim flanges, and inwardly offset flanges carried by one of the ends of the plates and underlying the ends of the adjacent plates, the outer edges of the plates being provided with circumferentially arranged inturned portions compressibly imbedded in the outer sides of the tire casing.

In testimony whereof they hereunto affix their signatures.

ALONZO A. RENTFROW.
JAMES T. BROWN, Jr.